United States Patent [19]

Miyagawa et al.

[11] Patent Number: 5,081,355
[45] Date of Patent: Jan. 14, 1992

[54] RADIATION IMAGE RECORDING AND READ-OUT APPARATUS

[75] Inventors: Ichirou Miyagawa; Toshitaka Agano, both of Kanagawa, Japan

[73] Assignee: Fuji Photo Film Co., Ltd., Kanagawa, Japan

[21] Appl. No.: 599,164

[22] Filed: Oct. 17, 1990

[30] Foreign Application Priority Data

Oct. 18, 1989 [JP] Japan .................. 1-270731

[51] Int. Cl.⁵ .......................................... G02B 42/02
[52] U.S. Cl. ................................... 250/327.2
[58] Field of Search ............... 250/327.2 B, 327.2 C, 250/327.2 D, 327.2 H, 327.2 J, 327.2 K, 484.1 B

[56] References Cited

U.S. PATENT DOCUMENTS

| | | | |
|---|---|---|---|
| 3,444,372 | 5/1969 | De Hart | 250/484.1 B X |
| 4,258,264 | 3/1981 | Kotera et al. | |
| 4,276,473 | 6/1981 | Kato et al. | |
| 4,315,318 | 2/1982 | Kato et al. | |
| 4,356,398 | 10/1982 | Komaki et al. | |
| 4,387,428 | 6/1983 | Ishida et al. | |
| 4,400,619 | 8/1983 | Kotera et al. | |
| 4,847,499 | 6/1989 | Horikawa | 250/327.2 |
| 4,849,631 | 7/1989 | Ono | 250/327.2 |
| 4,855,598 | 8/1989 | Ohgoda et al. | |
| 4,859,849 | 8/1989 | Shimura et al. | |
| 4,864,134 | 9/1989 | Hosoi et al. | |
| 4,947,043 | 8/1990 | Shimura | 250/327.2 |

FOREIGN PATENT DOCUMENTS

56-11395  2/1981  Japan .
56-12599  2/1981  Japan .

Primary Examiner—Constantine Hannaher
Assistant Examiner—Edward J. Glick
Attorney, Agent, or Firm—Sughrue, Mion, Zinn, Macpeak & Seas

[57] ABSTRACT

A radiation image recording and read-out apparatus comprises a belt feed device for positioning and moving a flexible, endless stimulable phosphor belt in its longitudinal direction, so that two desired portions of the stimulable phosphor belt, which have support sides that face each other, may be positioned for exposure to radiation in such a way that the support sides are in close, face-to-face contact with each other or are approximately parallel to and slightly spaced apart from each other. In an image recording section, radiation carrying image information is irradiated onto two portions of the stimulable phosphor belt, which have support sides that face each other and which have been positioned so as to be exposed to the radiation, and radiation images are thereby stored on the two portions. In a single image read-out section, the radiation images are read out from the two portions. The two portions are then erased in an erasing section. In an operating section, two image signals detected from the two portions in the image read-out section are added together or subtracted from each other.

12 Claims, 4 Drawing Sheets

RADIATION IMAGE RECORDING AND READ-OUT APPARATUS

BACKGROUND OF THE INVENTION

1. Field of the Invention

This invention relates to a radiation image recording and read-out apparatus wherein a radiation image is stored on each of different portions of a stimulable phosphor sheet, each portion of the stimulable phosphor sheet is then exposed to stimulating rays, which cause it to emit light in proportion to the amount of energy stored thereon during its exposure to radiation, and the emitted light is detected and converted into an electric image signal representing the whole radiation image. This invention particularly relates to a radiation image recording and read-out apparatus wherein an image signal, which represents the whole radiation image and which has a high signal-to-noise ratio (S/N ratio), is obtained or an image signal corresponding to a specific structure in a radiation image, i.e. to only a certain part of the whole radiation image, is obtained.

2. Description of the Prior Art

When certain kinds of phosphors are exposed to radiation such as X-rays, α-rays, β-rays, γ-rays, cathode rays or ultraviolet rays, they store part of the energy of the radiation. Then, when the phosphor which has been exposed to the radiation is exposed to stimulating rays such as visible light, light is emitted by the phosphor in proportion to the amount of energy which was stored. A phosphor exhibiting such properties is referred to as a stimulable phosphor.

As disclosed in U.S. Pat. Nos. 4,258,264, 4,276,473, 4,315,318 and 4,387,428 and Japanese Unexamined Patent Publication No. 56(1981)-11395, it has been proposed to use stimulable phosphors in radiation image recording and reproducing systems. Specifically, a sheet provided with a layer of the stimulable phosphor (hereinafter referred to as a stimulable phosphor sheet) is first exposed to radiation, which has passed through an object, such as a human body. In this manner, a radiation image of the object is stored on the stimulable phosphor sheet. The stimulable phosphor sheet, on which the radiation image has been stored, is then scanned with stimulating rays, which cause it to emit light in proportion to the amount of energy stored thereon during its exposure to the radiation. The light emitted by the stimulable phosphor sheet, when it is exposed to the stimulating rays, is photoelectrically detected and converted into an electric image signal. The electric image signal is then processed as desired, and the processed image signal is then used during the reproduction of a visible image which has good image quality and can serve as an effective tool, such as the efficient and accurate diagnosis of an illness. The visible image finally obtained may be reproduced in the form of a hard copy or may be displayed on a display device, such as a cathode ray tube (CRT) display device. In the radiation image recording and reproducing systems, the stimulable phosphor sheet is used to store the radiation image temporarily so that a final visible image can be reproduced therefrom on a final recording medium. For the sake of economy, therefore, it is desirable that the stimulable phosphor sheet be used repeatedly.

In order that the stimulable phosphor sheets may be reused as described above, the energy remaining on the stimulable phosphor sheet after it has been scanned with stimulating rays should be erased. For this purpose, the stimulable phosphor sheet may be exposed to light or heat as described in, for example, U.S. Pat. No. 4,400,619 or Japanese Unexamined Patent Publication No. 56(1981)-12599. The stimulable phosphor sheet may then be used again for the recording of a radiation image.

Techniques for carrying out superposition processing on radiation images have heretofore been disclosed in, for example, U.S. Pat. No. 4,356,398. In general, radiation images are used for diagnoses of illnesses and for other purposes. When a radiation image is used for such purposes, it is required that even small differences in the radiation energy absorption characteristics among structures of an object can be detected accurately in the radiation image. The extent, to which such differences in the radiation energy absorption characteristics can be detected in a radiation image, is referred to as the contrast detection performance or simply as the detection performance. A radiation image having better detection performance has better image quality and can serve as a more effective tool particularly in, the efficient and accurate diagnosis of an illness. Therefore, in order for the image quality to be improved, it is desirable that the detection performance of the radiation image may be improved. The detection performance is adversely affected by various noises.

In radiation image recording systems using stimulable phosphor sheets, it has been found that the noises described below occur during the step of recording a radiation image on a stimulable phosphor sheet and reading out the radiation image therefrom.

(1) A quantum noise of radiation produced by a radiation source.

(2) A noise due to nonuniformity in the distribution of the stimulable phosphor coated on the stimulable phosphor sheet or in the distribution of the stimulable phosphor grains on the stimulable phosphor sheet.

(3) A noise from stimulating rays, which cause the stimulable phosphor sheet to emit light in proportion to the amount of energy stored thereon during its exposure to radiation.

(4) An electric noise in the means for detecting light emitted by the stimulable phosphor sheet and converting it into an electric signal.

(5) A noise of light emitted by the stimulable phosphor sheet.

Superposition processing is carried out in order to reduce the aforesaid noises markedly so that even small differences in the radiation energy absorption characteristics among structures of an object can be found accurately in a visible radiation image, which is reproduced finally, i.e. the detection performance of the radiation image can be improved markedly. General techniques for superposition processing and its effects are described below.

A radiation image is stored on each of a plurality of stimulable phosphor sheets, which have been placed one upon another. Thereafter, an image read-out operation is carried out for each of the stimulable phosphor sheets. A plurality of image signals, which have been obtained from the image read-out operations, are superposed one upon another. In this manner, various noises described above can be reduced. Specifically, in general, noises described in (1) through (5) exhibit different distributions for different radiation images stored on the stimulable phosphor sheets. When the image signals detected from the stimulable phosphor sheets are superposed one upon another, the noises can be averaged. Therefore, the noises become imperceptible in a superposition image, which is obtained from superposition processing. Specifically, an image signal having a high S/N ratio is obtained from superposition processing. More specifically, most of the noises described in (1) through (5), particularly, the noise described in (1), which is one of dominant factors among the noises in a radiation image, can be approximated by the Poisson statistics. In cases where noises can be approximated by the Poisson statistics and two radiation images yield equivalent levels of signals S1 and S2 and equivalent levels of noises N1 and N2, the level of the signal corresponding to a superposition image equals $S1+S2$. The superposition image is obtained by carrying out superposition processing on the two radiation images. The level of noise in the superposition image becomes equal to $\sqrt{N1^2+N2^2}$. The S/N ratio is one of the indexes representing the detection performance of a radiation image. The S/N ratios of the two radiation images prior to superposition processing are represented by the formulas S1/N1 and S2/N2. After superposition processing has been carried out on the two radiation images, the S/N ratio of the superposition image is represented by the formula $(S1+S2)/\sqrt{N1^2+N2^2}$. Therefore, as a result of superposition processing, the S/N ratio can be improved. When superposition processing is carried out on image signals representing the two radiation images, the values of the image signals may be weighted such that a markedly high S/N ratio can be obtained.

When a visible radiation image is to be reproduced from the image signal obtained from superposition processing, gradation processing should preferably be carried out in order to improve the contrast of the image. In such cases, the contrast of the whole image may be improved. Alternatively, the contrast may be improved only for specific frequency components, i.e. frequency response enhancement processing may be carried out. As another alternative, both the processing for improving the contrast of the whole image and the frequency response enhancement processing may be carried out. When the values of a plurality of image signals are added together or averaged during superposition processing, an image signal detected from a stimulable phosphor sheet, which is located closer to the radiation source than the other stimulable phosphor sheets are, should preferably be weighted with a larger weighting coefficient. In this manner, a better superposition image can be obtained than when the values of the respective image signals are merely added or averaged. Appropriate weighting coefficients vary, depending on the number of the stimulable phosphor sheets, which are placed one upon another during the recording of the radiation images, the thicknesses of the stimulable phosphor sheets, or the like.

By way of example, when superposition processing is to be carried out, two stimulable phosphor sheets have heretofore been housed in a cassette such that they overlap one upon the other. Radiation images of an object are then recorded on the two stimulable phosphor sheets housed in the cassette. Thereafter, an image read-out operation is carried out on each of the two stimulable phosphor sheets, and two image signals are thereby obtained.

Also, techniques for carrying out subtraction processing on radiation images have heretofore been known. When subtraction processing is to be carried out, two radiation images recorded under different conditions are photoelectrically read out, and digital image signals which represent the radiation images are obtained. The image signal components of the digital image signals which represent corresponding picture elements in the radiation images are then subtracted from each other, and a difference signal is thereby obtained which represents the image of a specific structure or part of the object represented by the radiation images. With the subtraction processing method, two digital image signals are subtracted from each other in order to obtain a difference signal, and the radiation image of a specific structure can be reproduced from the difference signal.

Basically, subtraction processing is carried out with either the so-called temporal (time difference) subtraction processing method or the so-called energy subtraction processing method. In the former method, in order to extract the image of a specific structure of an object from the image of the whole object, the image signal representing a radiation image obtained without injection of contrast media is subtracted from the image signal representing a radiation image in which the image of the specific structure of the object is enhanced by the injection of contrast media. In the latter method, an object is exposed several times to radiation with different energy distributions, or the energy distribution of the radiation, which has passed through an object, is changed after it has been irradiated onto one of two radiation storage means, after which the radiation impinges upon the second storage means. In this manner, two radiation images, in which different images of a specific structure are embedded, are obtained. Thereafter, the image signals representing the two radiation images are weighted appropriately, when necessary, and subjected to a subtraction process in order to extract the image of the specific structure.

Subtraction processing is extremely effective, particularly for medical diagnosis, and electronics research has continued to develop improved subtraction processing methods.

In the aforesaid radiation image recording and reproducing systems utilizing a stimulable phosphor sheet, the radiation image stored on the stimulable phosphor sheet is read out directly as an electric image signal. Therefore, with such radiation image recording and reproducing systems, the aforesaid subtraction processing can readily be carried out. In cases where energy subtraction processing is to be carried out, radiation images may be stored on two stimulable phosphor sheets so that the parts of the radiation images corresponding to a specific structure are different in the two radiation images. For this purposes, two-shot energy subtraction processing may be employed wherein the operation for recording a radiation image is carried out twice with two kinds of radiation having different energy distributions. Alternatively, one-shot energy subtraction processing may be employed wherein, for example, two stimulable phosphor sheets placed one upon the other are simultaneously exposed to radiation, which has passed through an object, such that they are exposed to radiation having different energy distributions.

In order to carry out one-shot energy subtraction processing, the following methods have been proposed:

(1) A method wherein a filter, which is constituted of a metal or the like and which absorbs low energy components of radiation, is located between two stimulable phosphor sheets, and radiation having different energy distributions is thereby obtained.

(2) A method wherein two stimulable phosphor sheets provided with layers of different types of stimulable phosphors are utilized so that no filter need be used and radiation images to be subjected to subtraction processing can be recorded with a single image recording operation. With this method, a stimulable phosphor sheet provided with a stimulable phosphor layer, which absorbs more of the low energy components of the radiation than the stimulable phosphor layer of the other stimulable phosphor sheet, is positioned closer to the object (closer to the radiation source), and the two stimulable phosphor sheets are simultaneously exposed to radiation. Such a method is disclosed in, for example, U.S. Pat. No. 4,855,598.

However, in cases where radiation images are recorded on a plurality of stimulable phosphor sheets, which are placed one upon another, the stimulable phosphor sheets are housed in a cassette and subjected to the image recording operation. After the radiation images have been stored on the stimulable phosphor sheets but before they are read out from the stimulable phosphor sheets, the stimulable phosphor sheets must be taken out of the cassette and respectively loaded into new independent cassettes, so that the image read-out operation can be carried out on each of the stimulable phosphor sheets. Therefore, troublesome operations and considerable time are required.

Also, when the plurality of the stimulable phosphor sheets are sequentially subjected to the image read-out operations, the time taken for the image read-out operations becomes long.

As described above, though superposition processing and energy subtraction processing are efficient for diagnoses, the conventional techniques for superposition processing and energy subtraction processing have the drawbacks in that troublesome operations and considerable time are required. Therefore, it has heretofore not always been possible to carry out superposition processing or energy subtraction processing, particularly during mass medical examinations, or the like.

Accordingly, in Japanese Patent Application No. 1(1989)-53179, the applicant has proposed a novel radiation image recording and read-out apparatus. With the proposed radiation image recording and read-out apparatus, superposition processing or energy subtraction processing (specifically, one-shot energy subtraction processing utilizing no radiation energy converting filter) is carried out with a stimulable phosphor sheet such that troublesome operations for, for example, taking out stimulable phosphor sheets from a cassette need not be carried out and image read-out operations may be carried out quickly.

Specifically, in the proposed radiation image recording and read-out apparatus, two long strip-shaped, flexible stimulable phosphor sheets are located in parallel, and radiation images are recorded on the two stimulable phosphor sheets with a single, simultaneous exposure to radiation. Also, two independent image read-out sections for reading out the radiation images stored the stimulable phosphor sheets and two independent erasing sections for erasing any energy remaining on the stimulable phosphor sheets are provided for the two stimulable phosphor sheets, so that the two radiation images may be read out simultaneously.

With the proposed radiation image recording and read-out apparatus, no cassette is used, and superposition processing or energy subtraction processing can be carried out quickly and easily. Particularly, the proposed radiation image recording and read-out apparatus is advantageous for mass medical examinations, or the like, wherein quick processing is required.

However, with the proposed radiation image recording and read-out apparatus, two stimulable phosphor sheets are used. Therefore, two image read-out sections are necessary for reading out the radiation images from the two stimulable phosphor sheets. Accordingly, the radiation image recording and read-out apparatus has the drawbacks in that it becomes large and complicated.

SUMMARY OF THE INVENTION

The primary object of the present invention is to provide a radiation image recording and read-out apparatus which is suitable for practical use and with which superposition processing or energy subtraction processing (specifically, one-shot energy subtraction processing) is carried out such that troublesome operations for, for example, taking out stimulable phosphor sheets from a cassette need not be carried out.

Another object of the present invention is to provide a radiation image recording and read-out apparatus which has a single endless stimulable phosphor belt and only a single image read-out section, and in which superposition processing or energy subtraction processing is carried out with a very simple configuration.

The radiation image recording and read-out apparatus in accordance with the present invention is characterized by having a single flexible, endless stimulable phosphor belt, which serves as stimulable phosphor sheets. Two desired portions of the single stimulable phosphor belt, which have support sides that face each other, are located parallel and close to each other for exposure to radiation. Thus radiation images are recorded on the two desired portions with a single, simultaneous exposure to radiation. Also, the radiation image recording and read-out apparatus in accordance with the present invention is provided with a single image read-out section for reading out the radiation images, which have been stored on the stimulable phosphor belt, and an erasing section for erasing any energy remaining on the stimulable phosphor belt after a radiation image has been read out therefrom. In this manner, the radiation image recording and read-out apparatus in accordance with the present invention is kept simple.

The radiation image recording and read-out apparatus in accordance with the present invention may be embodied in various ways such that superposition processing, one-shot energy subtraction processing, or both the superposition processing and the energy subtraction processing can be carried out.

Specifically, in order that the superposition processing can be carried out, the present invention provides a radiation image recording and read-out apparatus comprising:

i) a flexible, endless stimulable phosphor belt capable of storing a plurality of radiation images thereon, ii) a belt feed means for positioning said endless stimulable phosphor belt and moving and circulating said stimulable phosphor belt in its longitudinal direction along a circulation path, so that two desired portions of said stimulable phosphor belt, which have support sides that face each other, may be positioned for exposure to radiation in such a way that the support sides are in close, face-to-face contact with each other or are approximately parallel to and slightly spaced apart from each other, iii) an image recording section in which radiation carrying image information is irradiated onto two portions of said stimulable phosphor belt, which have support sides that face each other and which have been positioned so as to be exposed to the radiation, and radiation images are thereby stored on said two portions of said stimulable phosphor belt, iv) a single image read-out section, which is located in the vicinity of said circulation path of said stimulable phosphor belt and in which a portion of said stimulable phosphor belt, on which a radiation image was stored, is exposed to stimulating rays, which cause said portion of said stimulable phosphor belt to emit light in proportion to the amount of energy stored thereon during its exposure to the radiation, said emitted light being photoelectrically detected and converted into an image signal by a photoelectric read-out means, v) an erasing section in which, before a next radiation image is stored on said portion of said stimulable phosphor belt after said image signal has been obtained therefrom in said image read-out section, energy remaining on said stimulable phosphor belt is erased, and vi) an operating section in which two image signals detected from two portions of said stimulable phosphor belt in said image read-out section are added together.

In order that one-shot energy subtraction processing can be carried out, the radiation image recording and read-out apparatus in accordance with the present invention may be embodied such that, instead of the operating section being used in which two image signals detected from two portions of the stimulable phosphor belt in the image read-out section are added together, an operating section is used in which the two image signals are subtracted from each other. In such cases, a radiation energy absorbing filter is located between the two desired portions of the stimulable phosphor belt, which have support sides that face each other and which are positioned for exposure to radiation. Alternatively, a support material of the stimulable phosphor belt may be constituted of a radiation energy absorbing filter.

In order that both the superposition processing and the one-shot energy subtraction processing can be carried out, the radiation image recording and read-out apparatus in accordance with the present invention may be embodied such that, instead of the operating section being used in which two image signals detected from two portions of the stimulable phosphor belt in the image read-out section are added together, an operating section is used in which both the addition process and the subtraction process are carried out on two image signals. In such cases, a radiation energy absorbing filter is moved into and out of the space between the two desired portions of the stimulable phosphor belt, which face each other and which are positioned for exposure to radiation.

The term "radiation energy absorbing filter" as used herein means a radiation energy converting filter which converts the energy distribution of the radiation passing therethrough, such that radiation having different energy distributions impinge upon the two portions of the stimulable phosphor belt located on both sides of the radiation energy converting filter. The radiation energy absorbing filter does not completely filter out the radiation.

In order for the two image signals to be added together or subtracted from each other, an image signal storage means may be used which stores an image signal detected first from one portion of the stimulable phosphor belt. The image signal may then be read from the image signal storage means, and the addition process or the subtraction process may be carried out on said image signal and a next image signal detected from the other portion of the stimulable phosphor belt. Alternatively, the two image signals may be stored in two image signal storage means, and may then be subjected to the addition process or the subtraction process.

As described above, two desired portions of the stimulable phosphor belt, which have support sides that face each other, may be positioned for exposure to radiation in such a way that the supports sides are in close, face-to-face contact with each other or are approximately parallel to and slightly spaced apart from each other. For example, during the image recording operation, two desired portions of the stimulable phosphor belt, which have support sides that face each other, may be positioned for exposure to radiation in such a way that the supports sides are in close, face-to-face contact with each other. Also, when the stimulable phosphor belt is to be moved, the two portions may be spaced apart from each other.

When a radiation image, which was stored on a portion of the stimulable phosphor belt, is to read out in the image read-out section, in order that an image signal having a high S/N ratio may be obtained, stimulating rays should preferably be irradiated from the same side of the stimulable phosphor belt as the source of the radiation during the image recording operation. Also, in cases where energy subtraction processing is to be carried out, if stimulating rays are irradiated from the same side of the stimulable phosphor belt as the source of the radiation was during the image read-out operation, a subtraction image having good image quality can be obtained from the energy subtraction processing.

This is because, when the radiation carrying image information is irradiated to the stimulable phosphor belt and a radiation image is stored thereon, the extent to which the radiation is scattered by the stimulable phosphor of the stimulable phosphor belt increases as the radiation advances from the radiation source side of the stimulable phosphor belt in the direction of the thickness of the stimulable phosphor belt. Therefore, at points comparatively deep within the stimulable phosphor belt, image information having comparatively high noise is stored. Also, the amount of image information stored decreases in the direction of the thickness of the stimulable phosphor belt.

With the radiation image recording and read-out apparatus in accordance with the present invention, the endless stimulable phosphor belt is employed, and only a single image read-out sec ion is used in which radiation images are read out from portions of the stimulable phosphor belt, on which the radiation images were stored. Therefore, with the radiation image recording and read-out apparatus in accordance with the present invention, superposition processing and energy subtraction processing can be carried out with a single configuration. As a result, a radiation image having a high S/N ratio, i.e. good detection performance, can be obtained easily from superposition processing. Also, a good radiation image of a specific structure or part of an object can be obtained easily from energy subtraction processing. Accordingly, the radiation image recording and read-out apparatus in accordance with the present invention is advantageous, for example, for preventing wrong diagnoses from being made and for finding a disease early.

DESCRIPTION OF THE PREFERRED EMBODIMENTS

The present invention will hereinbelow be described in further detail with reference to the accompanying drawings.

Figure 1:
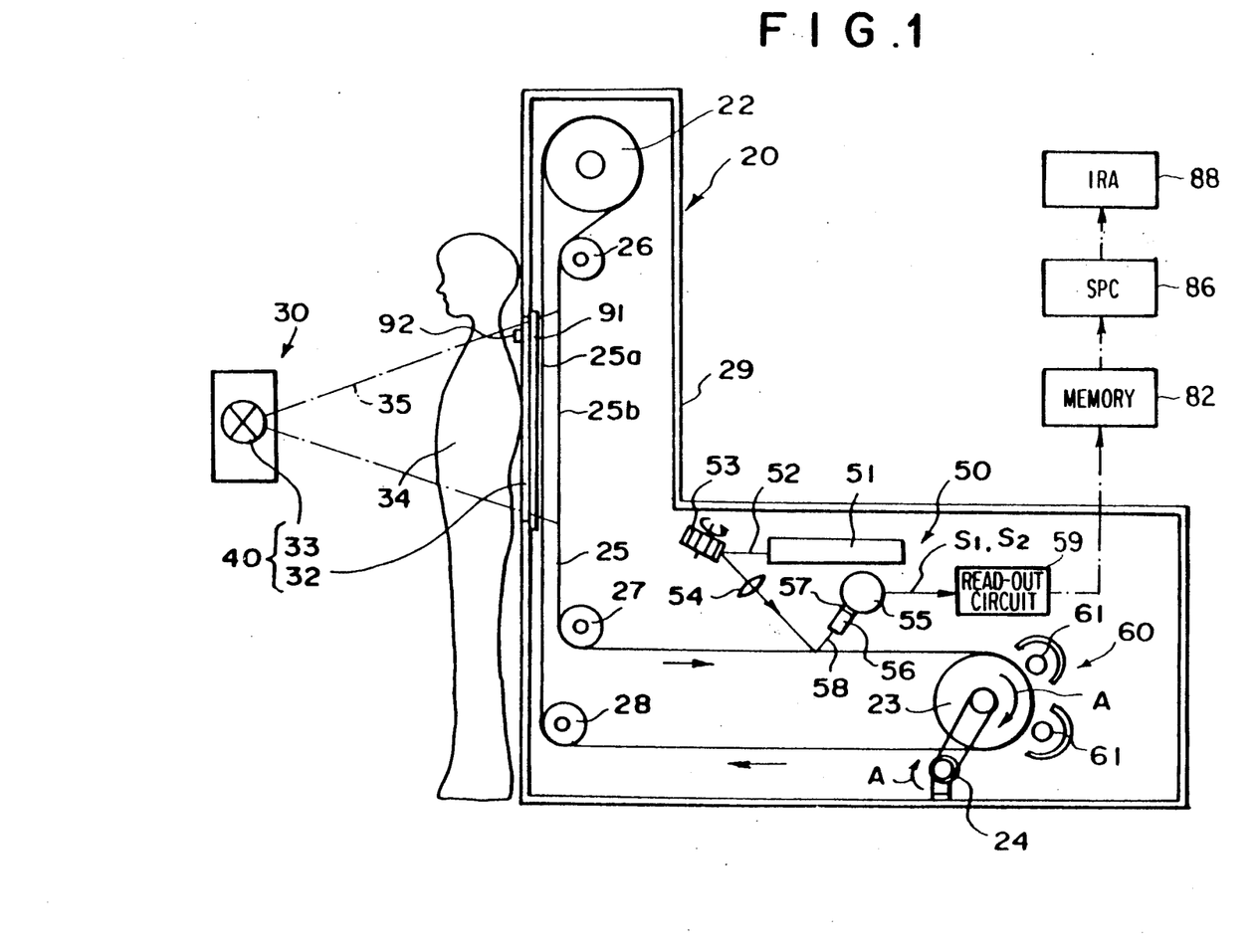
FIG. 1 is a schematic side view showing a first embodiment of the radiation image recording and read-out apparatus in accordance with the present invention.

FIG. 1 is a schematic side view showing a first embodiment of the radiation image recording and read-out apparatus in accordance with the present invention. By way of example, this embodiment carries out superposition processing.

With reference to FIG. 1, this embodiment is composed of a main body 20 and a radiation source housing section 30. In a housing 29 of the main body 20, a pulley 22 is located at the upper part, and a pulley 23 is located at the lower part and in the rear region. The pulleys 22 and 23 are rotated by a motor 24 in the direction indicated by the arrow A. The pulleys 22 and 23, rollers 26, 27, and 28, which will be described later, and the motor 24 constitute a belt feed means. A stimulable phosphor belt 25, which is capable of storing radiation images thereon, is threaded over the pulleys 22 and 23. The stimulable phosphor belt 25 is constituted of a flexible support material and a stimulable phosphor layer overlaid on the flexible support material, and takes on the form of an endless, long strip. The stimulable phosphor belt 25 is also threaded over the rollers 26, 27, and 28, which are located between the pulleys 22 and 23, and is moved and circulated in the directions indicated by the arrows. The stimulable phosphor belt 25 is positioned such that the flexible support material, which is permeable to radiation, faces inwardly toward the space defined by the endless belt, and the stimulable phosphor layer faces outwardly from of the space defined by the endless belt.

Also, the stimulable phosphor belt 25 is positioned such that its portions 25a and 25b facing each other are close and parallel to each other at the position between the rollers 26 and 27. This position is exposed to radiation 35, which has passed through an object 34.

An image recording stand 32 is located facing the portions of the stimulable phosphor belt 25 between the rollers 26 and 27. The aforesaid radiation source housing section 30 houses therein a radiation source 33, which may be constituted of an X-ray tube, or the like, and which faces the image recording stand 32. When radiation images of an object 34 are to be recorded, the object 34 (in this case, a person) is placed upright so that it is in contact with the image recording stand 32, and the radiation source 33 is then activated to produce the radiation 35. The radiation 35 passes through the object 34 and then impinges upon the portion 25a of the stimulable phosphor belt 25. In this manner, a radiation image of the object 34 is stored on the portion 25a of the stimulable phosphor belt 25 (specifically, on the portion of the stimulable phosphor layer overlaid on the stimulable phosphor belt 25). Also, the radiation 35, which has passed through the portion 25a of the stimulable phosphor belt 25, is irradiated onto the portion 25b of the stimulable phosphor belt 25, which is located close to the portion 25a. Therefore, a radiation image of the object 34 is stored on the portion 25b of the stimulable phosphor belt 25.

As will be clear from the foregoing, in this embodiment, an image recording section 40 is constituted of the image recording stand 32 and the radiation source 33. In this embodiment, a grid 91 for eliminating scattered radiation is provided between the image recording stand 32 and the portion 25a of the stimulable phosphor belt 25.

The radiation images stored on the portions 25a and 25b of the stimulable phosphor belt 25 are read out as electric image signals in an image read-out section 50. The image read-out section 50 comprises a laser beam source 51, and a light deflector 53, which may be constituted of a rotating polygon mirror, or the like. The light deflector 53 reflects and deflects a laser beam 52, which serves as stimulating rays and which is produced by the laser beam source 51, in the main scanning direction. The image read-out section 50 is also provided with a scanning lens 54 for converging the laser beam 52, which has been deflected by the light deflector 53, into a small spot having a predetermined diameter at every position to be scanned on the stimulable phosphor belt 25. The read-out section 50 also includes a motor 24, which serves as a sub-scanning means and which moves the stimulable phosphor belt 25 in the sub-scanning direction at a predetermined speed at least during the image read-out operation. The image read-out section 50 further comprises a long photomultiplier 55, which serves as a photoelectric read-out means and which is located such that a light receiving face of the long photomultiplier 55 extends along a scanning line (main scanning line) of the laser beam 52 on the stimulable phosphor belt 25, and a long light guide member 56, which is optically coupled with the light receiving face of the long photomultiplier 55. Additionally, a filter 57 for preventing the laser beam 52 from impinging upon the long photomultiplier 55, is located between the light guide member 56 and the long photomultiplier 55. The long photomultiplier is described in detail in, for example, U.S. Pat. No. 4,864,134.

After the radiation images of the object 34 have been stored on the portions 25a and 25b of the stimulable phosphor belt 25 in the manner described above, the motor 24 is rotated to move the stimulable phosphor belt 25 at a predetermined speed in the directions indicated by the arrows. At this time, an appropriate level of load is given by a known means to the stimulable phosphor belt 25 so that the stimulable phosphor belt 25 is always properly tensioned. While the stimulable phosphor belt 25 is moved in the sub-scanning direction by the motor 24, the laser beam source 51 and the light deflector 53 are activated, and the laser beam 52 scans the portion 25b of the stimulable phosphor belt 25 in the main scanning direction. When the portion 25b of the stimulable phosphor belt 25 is exposed to the laser beam 52, the portion 25b emits light 58 in proportion to the amount of energy stored thereon during its exposure to the radiation 35. The emitted light 58 enters the light guide member 56 and is efficiently detected by the long photomultiplier 55. Simultaneously with the main scanning of the laser beam 52 carried out in the manner described above, the stimulable phosphor belt 25 is moved in the sub-scanning direction as described above. Accordingly, the radiation image stored on the portion 25b of the stimulable phosphor belt 25 is two-dimensionally detected. A signal S1 is generated the long photomultiplier 55 and is fed to a read-out circuit 59.

Thereafter, the radiation image, which was stored on the portion 25a of the stimulable phosphor belt 25, is read out therefrom. A signal S2 (i.e. the signal representing the radiation image stored on the portion 25a of the stimulable phosphor belt 25) is generated by the long photomultiplier 55 in the image read-out section 50 and is also fed to the read-out circuit 59. The signals S1 and S2, which have thus been fed to the read-out circuit 59, are fed to a memory 82 and then to a signal processing circuit 86. The signal processing circuit 86 processes the signals received from the memory 82, and the processed signals are then fed to an image reproducing apparatus 88.

Figure 2:
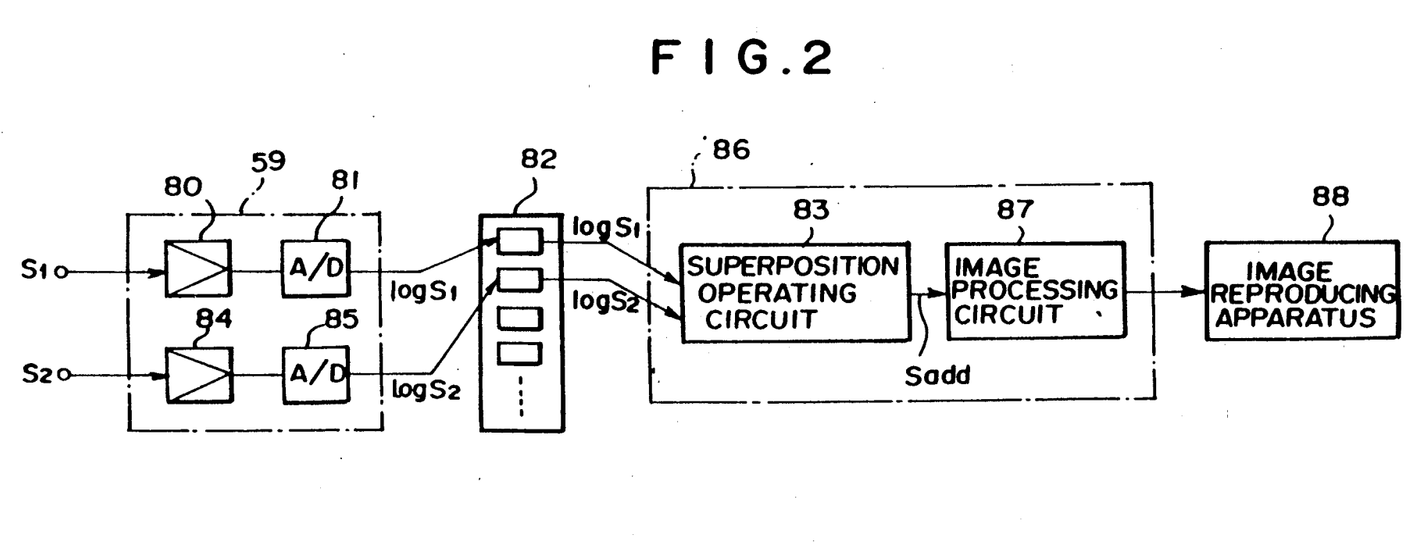
FIG. 2 is a block diagram showing a radiation image read-out circuit, a memory, a signal processing circuit, or the like, in the first embodiment.

How the signals S1 and S2 are processed in the read-out circuit 59 and subsequent circuits will hereinbelow be described with reference to FIG. 2. As described above, the signal S1 generated by the long photomultiplier 55 is fed to the read-out circuit 59. In the read-out circuit 59, the signal S1 is logarithmically amplified by a logarithmic amplifier 80, and is then digitized by an A/D converter 81 into a digital read-out image signal logS1. The digital read-out image signal logS1 is temporarily stored in the memory 82, then read therefrom and sent to a superposition operating circuit 83 in the signal processing circuit 86. Also, the signal S2 generated by the long photomultiplier 55 is fed to the read-out circuit 59. In the read-out circuit 59, the signal S2 is logarithmically amplified by a logarithmic amplifier 84 and is then digitized by an A/D converter 85 into a digital read-out image signal logS2. The digital read-out image signal logS2 thus obtained is temporarily stored in the memory 82, then read therefrom and sent to the superposition operating circuit 83 in the signal processing circuit 86.

The superposition operating circuit 83 weights the image signals logS1 and logS2 appropriately, and adds the image signal components of the weighted image signals together which represent corresponding picture elements in the two radiation images. Thus a digital sum signal Sadd is obtained, which can be expressed as $$Sadd = a \cdot logS1 + b \cdot logS2$$

where a and b each denote a weighting coefficient. The sum signal Sadd is fed into an image processing circuit 87, which carries out image processing, such as gradation processing or frequency response processing, on the sum signal Sadd. After being processed, the sum signal Sadd is sent to an image reproducing apparatus 88 and used during the reproduction of a visible radiation image. The image reproducing apparatus 88 may be a display means such as a cathode ray tube (CRT) or a recording apparatus for carrying out light beam scanning recording on a photosensitive film, or may be replaced by an apparatus for storing the image signals in an image file on an optical or magnetic disk.

In this embodiment, the image signals S1 and S2 are logarithmically amplified by the logarithmic amplifiers 80 and 84. Alternatively, instead of being logarithmically amplified, the image signals S1 and S2 may be directly digitized by the A/D converters 81 and 85. The superposing operations may then be carried out on the digital image signals thus obtained. In such cases, the superposing operations are carried out with the formula $$Sadd = a' S1 + b' \cdot S2$$

where a' and b' each denote a weighting coefficient. When the weighting coefficients a and b or the weighting coefficients a' and b' are adjusted to appropriate values in the course of carrying out the aforesaid superposing operations, a superposition image having a high S/N ratio, i.e. good detection performance, can be obtained from the sum signal Sadd. In the course of carrying out the superposing operations, it is necessary that the image signal components of the image signals logS1 and logS2 be added together which represent corresponding picture elements in the two radiation images. For this purpose, as shown in FIG. 1 by way of example, a marker 92 may be provided in the vicinity of the object 34, and corresponding picture elements in the image signals logS1 and logS2 may be found by utilizing the signal representing the marker 92 as a reference signal.

Instead of sending the read-out image signals logS1 and logS2 to the superposition operating circuit 83, an ordinary visible radiation image may be reproduced from the image signal logS1 or the image signal logS2. For this purpose, the image signal logS1 and the image signal logS2 may be stored in an image file on an optical disk, or the like.

Also, in the embodiment described above, the read-out circuit 5 is provided with the logarithmic amplifiers 80, 84 and the A/D converters 81, 85 for the signals S1 and S2. Alternatively, both signals S1 and S2 may be fed into a single logarithmic amplifier and a single A/D converter. The read-out image signals logS1 and logS2 generated by the A/D converter may then be fed to the memory 82 with different timings.

Reverting to FIG. 1, after the radiation images have been read out from the portions 25b and 25a of the stimulable phosphor belt 25 in the manner described above, the portions 25b and 25a are moved along the pulley 23. As a result, different portions of the stimulable phosphor belt 25 are positioned between the roller 28 and the pulley 22 and between the rollers 26 and 27. Therefore, radiation images can be stored on these portions of the stimulable phosphor belt 25 in the same manner as that described above. The recording of radiation images is thus carried out approximately over the overall length of the stimulable phosphor belt 25. At this time, the portions 25b and 25a of the stimulable phosphor belt 25 pass over an erasing section 60, which is located in the vicinity of the pulley 23. In the erasing section 60, any energy remaining on the portions 25b and 25a of the stimulable phosphor belt 25 after the radiation images have been read out therefrom is erased. The erasing section 60 is constituted of erasing light sources 61, 61, which are located on the side of the surface of the stimulable phosphor belt 25 on which surface the stimulable phosphor layer is overlaid. The erasing light sources 61, 61 are constituted of fluorescent lamps, or the like, and mainly produce erasing light having wavelengths falling within the stimulation wavelength range of the stimulable phosphor layers on the stimulable phosphor belt 25. The erasing light sources 61, 61 are turned on when the portions 25b and 25a of the stimulable phosphor belt 25 move along the pulley 23. As the portions 25b and 25a of the stimulable phosphor belt 25 are exposed to the erasing light, any energy remaining on the portions 25b and 25a after the radiation images have been read out therefrom is released therefrom.

In this manner, the portions 25b and 25a of the stimulable phosphor belt 25, from which any residual energy has been erased to such an extent that they are reusable for the recording of radiation images, are moved by the pulleys 22 and 23. Therefore, the image recording and read-out operations can be repeated on the stimulable phosphor belt 25. As the erasing light sources 61, 61, tungsten-filament lamps, halogen lamps, infrared ray lamps or xenon flash lamps as disclosed in U.S. Pat. No. 4,400,619 may be used as well as the aforesaid fluorescent lamps. The erasing section 60 may also be constituted of surface light sources such as panels each composed of light emitting diodes (LED's) arrayed two-dimensionally or electroluminescence plates (EL plates).

Figure 3:
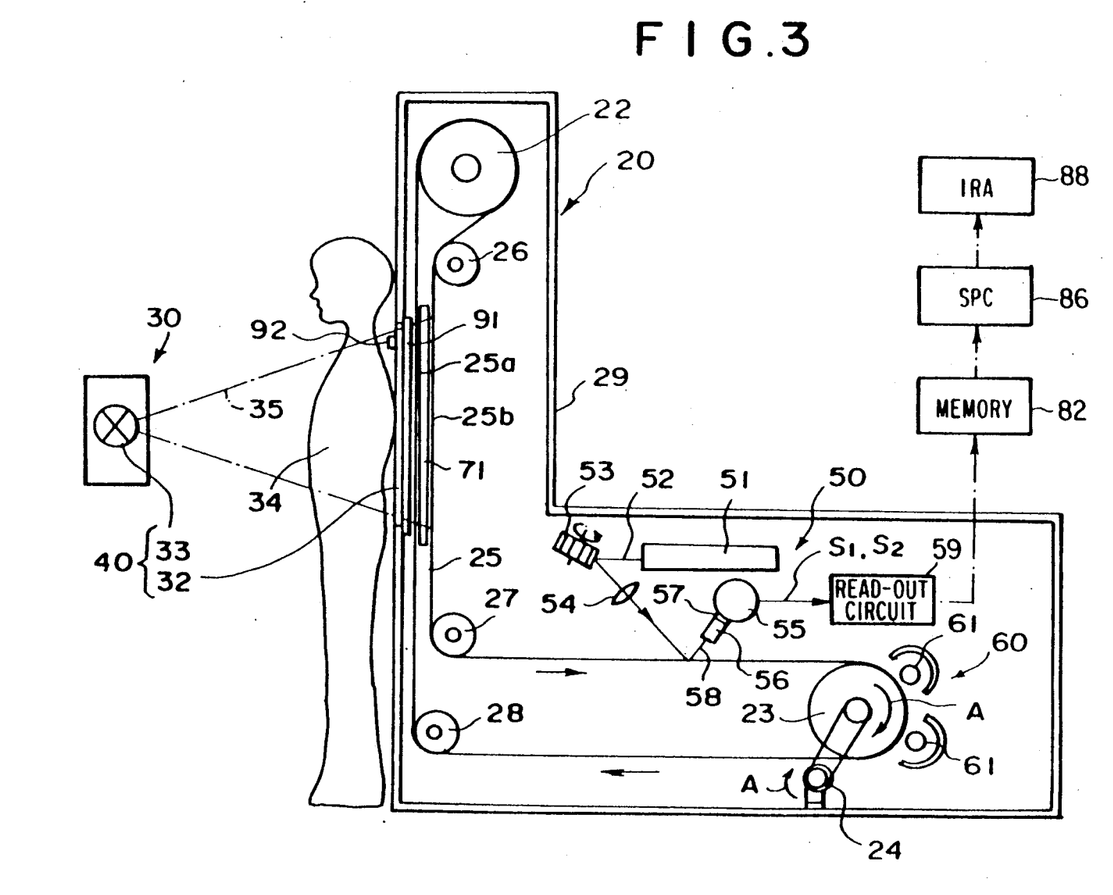
FIG. 3 is a schematic side view showing a second embodiment of the radiation image recording and read-out apparatus in accordance with the present invention.
Figure 4:
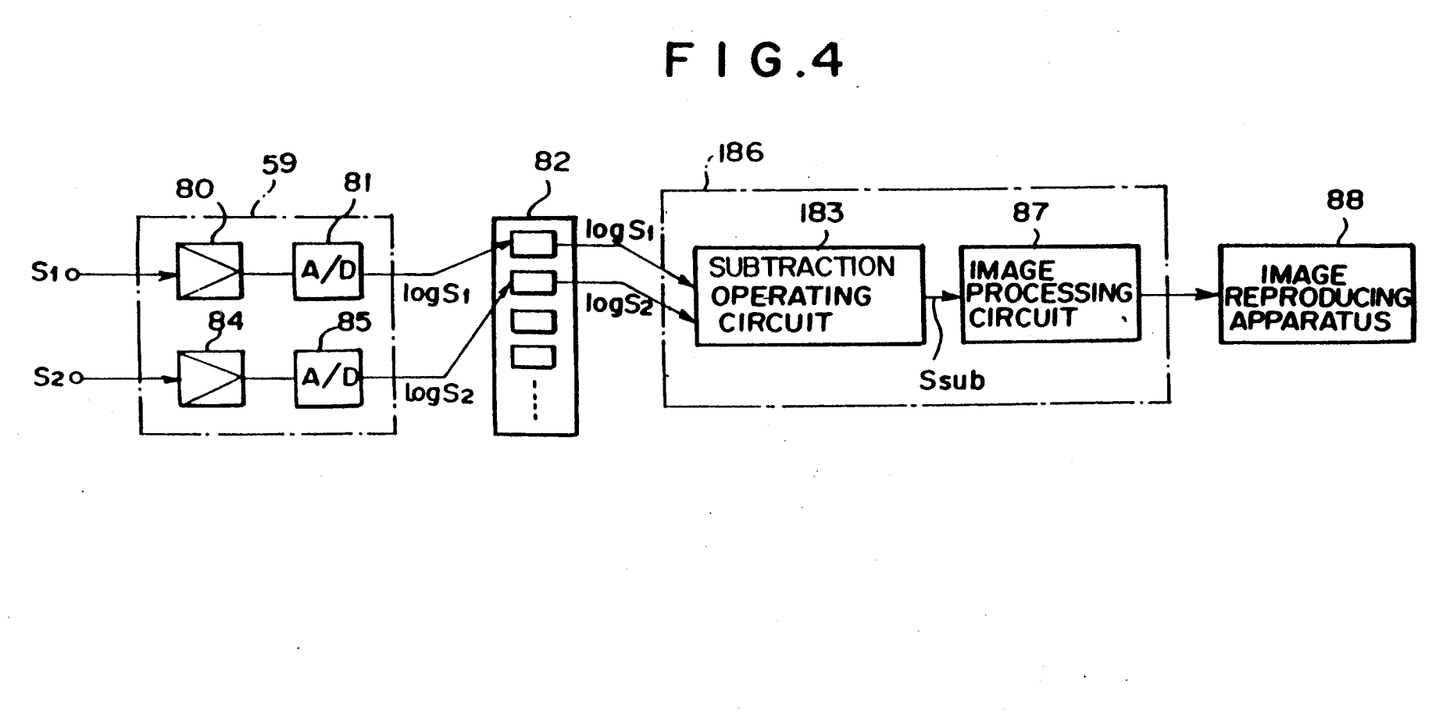
FIG. 4 is a block diagram showing a radiation image read-out circuit, a memory, a signal processing circuit, or the like, in the second embodiment.

A second embodiment of the radiation image recording and read-out apparatus in accordance with the present invention will be described hereinbelow with reference to FIGS. 3 and 4. In FIGS. 3 and 4, similar elements are numbered with the same reference numerals with respect to FIGS. 1 and 2.

In this embodiment, a radiation energy absorbing filter is used during the image recording operation, and energy subtraction processing is carried out. A radiation energy absorbing filter 71 is located between the portions 25a and 25b of the stimulable phosphor belt 25, which face each other and which are positioned for exposure to radiation between the pulley 22 and the roller 28 and between the rollers 26 and 27.

A radiation image is stored with radiation having a high energy level on the portion 25a of the stimulable phosphor belt 25, which is located in front of the radiation energy absorbing filter 71. Also, a radiation image is stored with radiation having a low energy level on the portion 25b of the stimulable phosphor belt 25, which is located at the rear of the radiation energy absorbing filter 71. Therefore, an energy subtraction image can be obtained by subtracting the image signals from each other, which have been detected from the portions 25a and 25b of the stimulable phosphor belt 25. Energy subtraction processing is described in detail in, for example, U.S. Pat. Nos. 4,855,598 and 4,859,849.

The radiation energy absorbing filter 71 may be constituted of a material, which absorbs part of radiation, for example, a Cu plate.

In this embodiment, as illustrated in FIG. 4, an operating circuit 183 of a signal processing circuit 186 carries out subtracting operations. The subtraction operating circuit 183 weights the image signals logS1 and logS2, and subtracts the image signal components of the weighted image signals from each other which represent corresponding picture elements in the two radiation images. Thus a digital difference signal Ssub is obtained, which can be expressed as $$Ssub = a \cdot logS1 - b \cdot logS2 - c$$

where a and b each denote a weighting coefficient, and c denotes a bias component. The difference signal Ssub is fed into the image processing circuit 87 which carries out image processing, such as gradation processing or frequency response processing, on the difference signal Ssub. After being processed, the difference signal Ssub is sent to the image reproducing apparatus 88 and used during the reproduction of a visible radiation image.

If the weighting coefficients a and b are adjusted to appropriate values in the course of the aforesaid subtracting operations being carried out, image signal components representing parts of the object 34 other than the specific structure are eliminated in the obtained difference signal Ssub. Therefore, a visible image of the specific structure can be reproduced from the difference signal Ssub.

In the embodiment of FIG. 3, the radiation energy absorbing filter 71 is located between the portions 25a and 25b of the stimulable phosphor belt 25, which face each other. Alternatively, in order that no independent filter need be used, the support material of the stimulable phosphor belt 25 may be constituted of a material capable of serving as the radiation energy absorbing filter, and a stimulable phosphor layer may be overlaid on the support material. Specifically, the surface of the stimulable phosphor belt 25, which faces inwardly toward the space defined by the endless belt, may be constituted as a filter, and a stimulable phosphor layer may be overlaid on the surface of the stimulable phosphor belt 25, which faces outwardly from the space defined by the endless belt. In such cases, two parts of the support material corresponding to the portions 25a and 25b of the stimulable phosphor belt 25 serve as radiation energy absorbing filters. Therefore, no independent filter need be used. Also, the stimulable phosphor layers at the portions 25a and 25b of the stimulable phosphor belt 25 can be located closer to each other and, as a result, a more accurate energy subtraction image can be obtained.

As another alternative, the radiation energy absorbing filter 71 may be moved into and out of the space between the portions 25a and 25b of the stimulable phosphor belt 25. Also, the operating section may be selectively set to an addition process mode or a subtraction process mode. In such cases, two radiation images can be recorded without the radiation energy absorbing filter 71 being used, and the addition process can be carried out on the two radiation images. Also, two radiation images can be recorded with the radiation energy absorbing filter 71 being used, and the subtraction process can be carried out on the two radiation images. Such an embodiment can serve as both the embodiment for the superposition processing, which is shown in FIG. 1, and the embodiment for the energy subtraction processing, which is shown in FIG. 3.

As a still further alternative, in lieu of the radiation energy absorbing filter 71, a filter which completely filters out the radiation (e.g. a Pb plate) may be moved into the space between the portions 25a and 25b of the stimulable phosphor belt 25. In such cases, during the image recording operation, the radiation impinges only upon the portion 25a of the stimulable phosphor belt 25, which is located in front of the filter. Therefore, the ordinary recording of a single radiation image or the image recording for two-shot energy subtraction processing can be carried out. For this purpose, the filter which completely filters out the radiation may be provided such that it can be moved into and out of the space between the portions 25a and 25b of the stimulable phosphor belt 25.

We claim:

1. A radiation image recording and read-out apparatus comprising:

i) a flexible, endless stimulable phosphor belt capable of storing a plurality of radiation images thereon, ii) a belt feed means for positioning said endless stimulable phosphor belt and moving and circulating said stimulable phosphor belt in its longitudinal direction along a circulation path, so that two desired portions of said stimulable phosphor belt, which have support sides that face each other, may be positioned for exposure to radiation in such a way that said support sides are in close, face-to-face contact with each other or are approximately parallel to and slightly spaced apart from each other, iii) an image recording section in which radiation carrying image information is irradiated onto said two desired portions of said stimulable phosphor belt, which have support sides that face each other and which have been positioned so as to be exposed to the radiation, and radiation images are thereby stored on said two desired portions of said stimulable phosphor belt, iv) a single image read-out section, which is located in the vicinity of said circulation path of said stimulable phosphor belt and in which a portion of said stimulable phosphor belt, on which a radiation image was stored, is exposed to stimulating rays, which cause said portion of said stimulable phosphor belt to emit light in proportion to the amount of energy stored thereon during its exposure to the radiation, said emitted light being photoelectrically detected and converted into an image signal by a photoelectric read-out means, v) an erasing section in which, before a next radiation image is stored on said portion of said stimulable phosphor belt after said image signal has been obtained therefrom in said image read-out section, energy remaining on said stimulable phosphor belt is erased, and vi) an operating section in which two image signals detected from said two desired portions of said stimulable phosphor belt in said image read-out section are added together.

2. An apparatus as defined in claim 1 wherein a filter for completely filtering out the radiation is located such that it can be moved into and out of the space between said two desired portions of said stimulable phosphor belt, which have support surfaces that face each other and which have been positioned so as to be exposed to the radiation.

3. An apparatus as defined in claim 1 wherein said stimulating rays are a laser beam.

4. A radiation image recording and read-out apparatus comprising:

i) a flexible, endless stimulable phosphor belt capable of storing a plurality of radiation images thereon, ii) a belt feed means for positioning said endless stimulable phosphor belt and moving and circulating said stimulable phosphor belt in its longitudinal direction along a circulation path, so that two desired portions of said stimulable phosphor belt, which have support sides that face each other, may be positioned for exposure to radiation in such a way that said support sides are in close, face-to-face contact with each other or are approximately parallel to and slightly spaced apart from each other, iii) a radiation energy absorbing filter which is located between said two desired portions of said stimulable phosphor belt, which have support sides that face each other and which have been positioned so as to be exposed to the radiation, iv) an image recording section in which radiation carrying image information is irradiated onto said two desired portions of said stimulable phosphor belt, which have support sides that face each other and which have been positioned so as to be exposed to the radiation, and radiation images are thereby stored on said two desired portions of said stimulable phosphor belt, v) a single image read-out section, which is located in the vicinity of said circulation path of said stimulable phosphor belt and in which a portion of said stimulable phosphor belt, on which a radiation image was stored, is exposed to stimulating rays, which cause said portion of said stimulable phosphor belt to emit light in proportion to the amount of energy stored thereon during its exposure to the radiation, said emitted light being photoelectrically detected and converted into an image signal by a photoelectric read-out means, vi) an erasing section in which, before a next radiation image is stored on said portion of said stimulable phosphor belt after said image signal has been obtained therefrom in said image read-out section, energy remaining on said stimulable phosphor belt is erased, and vii) an operating section in which two image signals detected from said two desired portions of said stimulable phosphor belt in said image read-out section are added together.

5. An apparatus as defined in claim 1 wherein a filter for completely filtering out the radiation is located such that it can be moved into and out of the space between said two desired portions of said stimulable phosphor belt, which have support sides that face each other and which have been positioned so as to be exposed to the radiation.

6. An apparatus as defined in claim 4 wherein said stimulating rays are a laser beam.

7. A radiation image recording and read-out apparatus comprising:

i) a flexible, endless stimulable phosphor belt composed of a support material, which serves as a radiation energy absorbing filter, and a stimulable phosphor layer, which is overlaid on said support material and which is capable of storing a plurality of radiation images thereon, ii) a belt feed means for positioning said endless stimulable phosphor belt and moving and circulating said stimulable phosphor belt in its longitudinal direction along a circulation path, so that two desired portions of said stimulable phosphor belt, which have support sides that face each other, may be positioned for exposure to radiation in such a way that said support sides are in close, face-to-face contact with each other or are approximately parallel to and slightly spaced apart from each other, iii) an image recording section in which radiation carrying image information is irradiated onto said two desired portions of said stimulable phosphor belt, which have support sides that face each other and which have been positioned so as to be exposed to the radiation, and radiation images are thereby stored on said two desired portions of said stimulable phosphor belt, iv) a single image read-out section, which is located in the vicinity of said circulation path of said stimulable phosphor belt and in which a portion of said stimulable phosphor belt, on which a radiation image was stored, is exposed to stimulating rays, which cause said portion of said stimulable phosphor belt to emit light in proportion to the amount of energy stored thereon during its exposure to the radiation, said emitted light being photoelectrically detected and converted into an image signal by a photoelectric read-out means, v) an erasing section in which, before a next radiation image is stored on said portion of said stimulable phosphor belt after said image signal has been obtained therefrom in said image read-out section, energy remaining on said stimulable phosphor belt is erased, and vi) an operating section in which two image signals detected from said two desired portions of said stimulable phosphor belt in said image read-out section are subtracted from each other.

8. An apparatus as defined in claim 7 wherein a filter for completely filtering out the radiation is located such that it can be moved into and out of the space between said two desired portions of said stimulable phosphor belt, which have support sides that face each other and which have been positioned so as to be exposed to the radiation.

9. An apparatus as defined in claim 7 wherein said stimulating rays are a laser beam.

10. A radiation image recording and read-out apparatus comprising:
   i) a flexible, endless stimulable phosphor belt capable of storing a plurality of radiation images thereon,
   ii) a belt feed means for positioning said endless stimulable phosphor belt and moving and circulating said stimulable phosphor belt in its longitudinal direction along a circulation path, so that two desired portions of said stimulable phosphor belt, which have support sides that face each other, may be positioned for exposure to radiation in such a way that said support sides are in close, face-to-face contact with each other or are approximately parallel to and slightly spaced apart from each other,
   iii) a radiation energy absorbing filter which is capable of being moved into and out of the space between said two desired portions of said stimulable phosphor belt, which have support sides that face each other and which have been positioned so as to be exposed to the radiation,
   iv) an image recording section in which radiation carrying image information is irradiated onto said two desired portions of said stimulable phosphor belt, which have support sides that face each other and which have been positioned so as to be exposed to the radiation, and radiation images are thereby stored on said two desired portions of said stimulable phosphor belt,
   v) a single image read-out section, which is located in the vicinity of said circulation path of said stimulable phosphor belt and in which a portion of said stimulable phosphor belt, on which a radiation image was stored, is exposed to stimulating rays, which cause said portion of said stimulable phosphor belt to emit light in proportion to the amount of energy stored thereon during its exposure to the radiation, said emitted light being photoelectrically detected and converted into an image signal by a photoelectric read-out means,
   vi) an erasing section in which, before a next radiation image is stored on said portion of said stimulable phosphor belt after said image signal has been obtained therefrom in said image read-out section, energy remaining on said stimulable phosphor belt is erased, and
   vii) an operating section in which two image signals detected from said two desired portions of said stimulable phosphor belt in said image read-out section are added together or subtracted from each other.

11. An apparatus as defined in claim 10 wherein a filter for completely filtering out the radiation is located such that it can be moved into and out of the space between said two desired portions of said stimulable phosphor belt, which have support sides that face each other and which have been positioned so as to be exposed to the radiation.

12. An apparatus as defined in claim 10 wherein said stimulating rays are a laser beam.

* * * * *